United States Patent
Szumski et al.

(10) Patent No.: US 9,527,340 B2
(45) Date of Patent: Dec. 27, 2016

(54) COMPOSITE LAMINATE ASSEMBLY AND METHOD OF MANUFACTURING THE SAME

(71) Applicant: Illinois Tool Works Inc., Glenview, IL (US)

(72) Inventors: Daniel M. Szumski, Saint John, IN (US); William A. Herring, Glenview, IL (US); Suwit Sangkaratana, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/833,688

(22) Filed: Aug. 24, 2015

(65) Prior Publication Data

US 2016/0059621 A1    Mar. 3, 2016

Related U.S. Application Data

(60) Provisional application No. 62/043,751, filed on Aug. 29, 2014.

(51) Int. Cl.

| | |
|---|---|
| *B44F 1/10* | (2006.01) |
| *B32B 38/14* | (2006.01) |
| *B44C 1/175* | (2006.01) |
| *B44C 1/20* | (2006.01) |
| *B44F 9/00* | (2006.01) |
| *B44C 3/02* | (2006.01) |

(Continued)

(52) U.S. Cl.
CPC ............... *B44F 1/10* (2013.01); *B05D 5/061* (2013.01); *B05D 7/50* (2013.01); *B32B 38/06* (2013.01); *B32B 38/14* (2013.01); *B42D 25/328* (2014.10); *B42D 25/425* (2014.10); *B42D 25/45* (2014.10); *B44C 1/005* (2013.01); *B44C 1/175* (2013.01); *B44C 1/1758* (2013.01); *B44C 1/20* (2013.01); *B44C 3/02* (2013.01); *B44F 1/02* (2013.01); *B44F 1/14* (2013.01); *B44F 9/00* (2013.01); *B33Y 10/00* (2014.12)

(58) Field of Classification Search
CPC .............. B44C 1/175; B44C 1/20; B44C 3/02; B32B 38/06; B32B 38/14; B44F 9/00
See application file for complete search history.

(56) References Cited

U.S. PATENT DOCUMENTS

2005/0048304 A1 *  3/2005  Jones ...................... B44C 5/04
                                                        428/542.2
2006/0246266 A1    11/2006  Hall
(Continued)

FOREIGN PATENT DOCUMENTS

DE  102008036481           2/2010
JP  2001/328398 A  *  11/2001  ............. B44C 1/175
(Continued)

OTHER PUBLICATIONS

International Search Report for Application No. PCT/US2015/046649 dated Dec. 7, 2015. (13 pages).

*Primary Examiner* — Betelhem Shewareged
(74) *Attorney, Agent, or Firm* — Christopher R. Carroll; The Small Patent Law Group, LLC.

(57) ABSTRACT

A method for the manufacture of a composite laminate assembly that includes decorative, functional, security, reflective, diffractive, holographic elements for liquid transfer onto the surface of a variety of base materials or work piece having a flat or complex three dimensional shape.

20 Claims, 5 Drawing Sheets

(51) Int. Cl.
*B32B 38/06* (2006.01)
*B44F 1/02* (2006.01)
*B44F 1/14* (2006.01)
*B05D 5/06* (2006.01)
*B05D 7/00* (2006.01)
*B44C 1/00* (2006.01)
*B42D 25/425* (2014.01)
*B42D 25/45* (2014.01)
*B42D 25/328* (2014.01)
*B33Y 10/00* (2015.01)

(56) References Cited

U.S. PATENT DOCUMENTS

2007/0087171 A1* 4/2007 Hikasa .................. B44C 1/1758
 428/195.1
2011/0265953 A1* 11/2011 Kroell .................. B44C 1/1758
 156/378
2013/0291746 A1* 11/2013 Ikeda ..................... B44C 1/175
 101/368

FOREIGN PATENT DOCUMENTS

| JP | 2001328398 | 11/2001 |
| JP | 2013000895 | 1/2013 |
| WO | 2005068209 | 7/2005 |

* cited by examiner

COMPOSITE LAMINATE ASSEMBLY AND METHOD OF MANUFACTURING THE SAME

CROSS-REFERENCE TO RELATED APPLICATIONS

This application claims priority to U.S. Provisional Application No. 62/043,751, which was filed on 29 Aug. 2014, and the entire disclosure of which is incorporated herein by reference.

BACKGROUND

The present disclosure relates to laminate assemblies for forming images on various objects, such as three dimensional (3D) surfaces or other surfaces.

Traditionally, water or hydrographic transfers to non-planar or 3D surfaces have included a construction having a water-dissolvable carrier film on which conventional inks and coatings are printed. The carrier film may be a cast polyvinyl alcohol (PVA) of sufficient thickness to serve as a carrier in subsequent printing processes. The inks printed on the carrier may be solvent based and applied via printing methods such as gravure, but could also be printed using gravure, flexography, lithography, screen printing, thermal transfer printing, ink jet printing, or other short-run printing techniques.

The inks may be printed with a variety of patterns and may also decorate multiple objects at the same time in the water-transfer process downstream of printing the inks onto the carrier film. Many decorated items are post-finished, such as by over-coating the items with clear polymer coatings on top of the decorated surfaces of the items to protect the decorations. This subsequent process can be accomplished with a spray application of the clear coat (e.g., spray painting).

But, the final products formed using the aforementioned transfer processes often are interior applications, as the pigments in the inks and the coatings employed are not suitable for exterior or harsh service environments.

BRIEF DESCRIPTION

In one embodiment, a laminate assembly for decorating an object in a hydrographic transfer system is provided. The laminate assembly includes a carrier film configured to be soluble when placed into the hydrographic transfer system, an optical effect layer configured to provide one or more of an optical effect or a security feature to the object, one or more ink layers disposed between the carrier film and the coat layer, and a coat layer disposed between the one or more ink layers and the optical effect layer. The effect layer includes a relief pattern configured to provide the one or more of the optical effect or the security feature to the object.

In another embodiment, another laminate assembly for transferring decoration onto an object in a hydrographic transfer system is provided. The laminate assembly includes a carrier film configured to be soluble when placed into the hydrographic transfer system, an optical effect layer configured to provide one or more of an optical effect or a security feature to the object, and a coat layer disposed between the carrier layer and the optical effect layer. The effect layer includes a relief pattern configured to provide the one or more of the optical effect or the security feature to the object.

In another embodiment, a method for manufacturing a laminate assembly for being transferred onto an object in a hydrographic transfer system is provided. The method includes depositing one or more ink layers above a carrier film configured to be soluble when placed into the hydrographic transfer system, depositing a coat layer above the one or more ink layers, depositing an optical effect layer above the coat layer, and forming a relief pattern in the optical effect layer. The relief pattern is configured to provide one or more of an optical effect or a security feature to the object.

In another embodiment, another method for manufacturing a laminate assembly for printing on an object in a hydrographic transfer system is provided. The method includes depositing a coat layer above a carrier film, depositing an optical effect layer above the coat layer, and forming a relief pattern in the optical effect layer. The relief pattern is configured to provide one or more of an optical effect or a security feature to the object.

BRIEF DESCRIPTION OF THE DRAWINGS

The present inventive subject matter will be better understood from reading the following description of non-limiting embodiments, with reference to the attached drawings (which are not necessarily drawn to scale), wherein below.

DETAILED DESCRIPTION

One or more embodiments described herein relate to laminate assemblies (and methods for manufacturing the laminate assemblies) that can be used for decorating objects such as objects having 3D surfaces, such as via a liquid transfer process (e.g., water transfer). In contrast to other liquid transfer processes, the laminate assemblies described herein may include one or more effect layers to provide for holographic, diffraction, security, textured, or brushed metallic patterns on a 3D surface of an object. The effect layers may be generated by printing, embossing, vapor depositing, or the like, metallic materials and/or high refractive index (HRI) materials to create the decorative or security effects. The HRI materials may be materials having a refractive index of at least 1.5 in one embodiment.

Figure 1:
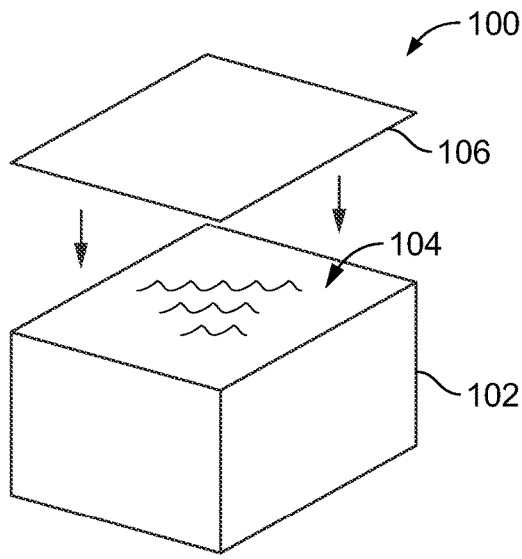
FIG. 1 is a schematic diagram of a hydrographic transfer system according to one embodiment.

FIG. 1 is a schematic diagram of a hydrographic transfer system 100 according to one embodiment. The system 100 includes a vat 102 that holds a fluid 104, such as water. A laminate assembly 106 is floated on top of the surface of the fluid 104. As described below, this laminate assembly 106 may have a carrier film with one or more decorative layers disposed thereon. These decorative layers may include optical layers and/or effect layers that provide one or more decorative, electronic, or security features, ink printed layers, or the like. The carrier film may dissolve in the fluid 104 such that the decorative layers remain floating on the surface of the fluid 104. An object to be decorated or laminated upon is then dipped into the fluid 104. The decorative layers attach to the 3D surface of the object to decorate one or more images of the decorative layers onto the 3D surface of the object.

Several embodiments of different laminate assemblies that may be used as the laminate assembly 106 are described herein. The drawings are not drawn to scale such that one or more films or layers may be larger or smaller than other films or layers shown in the Figures.

Figure 2:
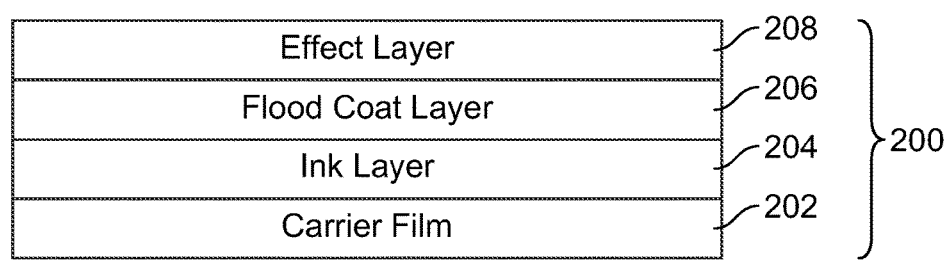
FIG. 2 illustrates a cross-sectional view of a laminate assembly during manufacturing of the laminate assembly according to one embodiment.
Figure 3:
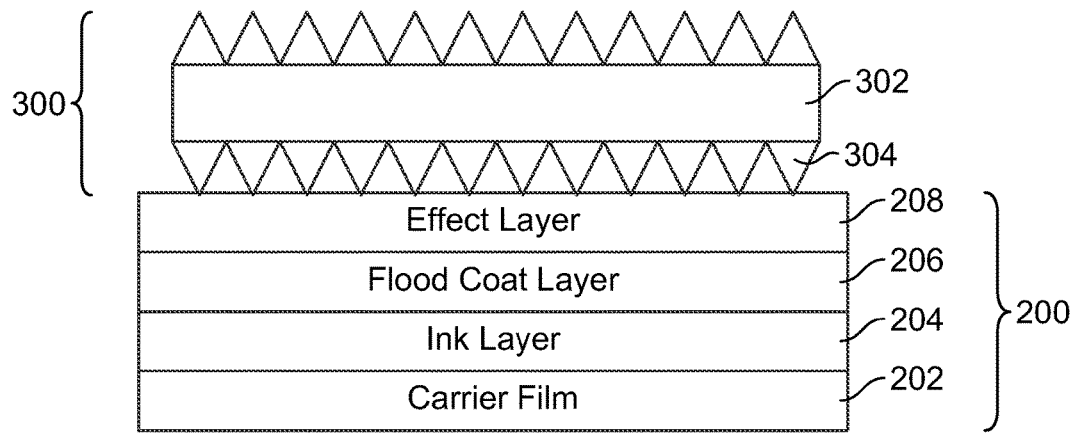
FIG. 3 illustrates a cross-sectional view of a laminate assembly during manufacturing of the laminate assembly according to one embodiment.
Figure 4:
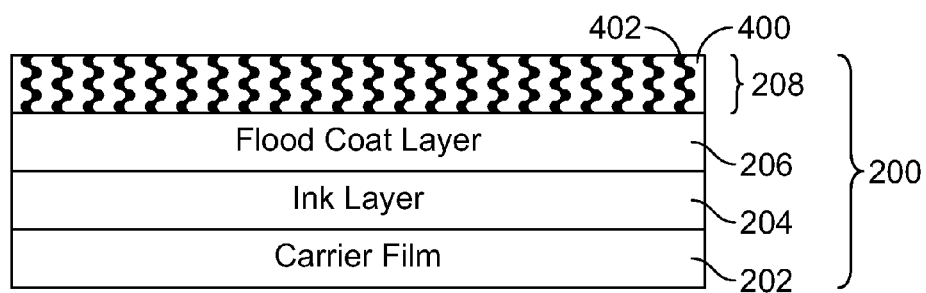
FIG. 4 illustrates a cross-sectional view of a laminate assembly during manufacturing of the laminate assembly according to one embodiment.

FIGS. 2 through 4 illustrate cross-sectional views of a laminate assembly 200 during manufacturing of the laminate assembly 200 according to one embodiment. The laminate assembly 200 may represent the laminate assembly 106 shown in FIG. 1. The laminate assembly 200 includes a carrier film 202 that supports additional layers of the laminate assembly 200. The carrier film 202 may be formed from a material that can support the additional layers of the laminate assembly 200 during manufacture of the laminate assembly 200, which may include printing images on one or more layers, metallizing one or more layers, carrying the laminate assembly 200 to the vat 102 for hydrographic transfer, and the like. The carrier film 202 can be formed from a material that dissolves upon contact with the fluid 104 and/or another chemical agent, such as polyvinyl alcohol (PVA) or another material.

An ink layer 204 is disposed on the carrier film 202. The ink layer 204 represents one or more layers of ink that generate a visual image, design, or the like, to be at least partially visible on the 3D surface of the object to be decorated. The ink layer 204 may be formed on the carrier film 202 using one or more printing processes, such as thermal transfer printing, digital ink jet printing, three dimensional printing, gravure printing, or the like. The one or more inks that form the ink layer 204 may be free-radicals, ultraviolet and electron beam (UV/EB) inks or another type of ink. These types of inks and printing processes can reduce or eliminate the amount of residual solvents in the laminate assembly 200, which can assist in the deposition of an effect layer 208, described below. In one aspect, the inks used to form the ink layer 204 can be cross-linked, such as by exposing the inks to thermal, UV light or EB radiation. Cross-linking the inks after transfer of the ink layer 204 can reduce the need for additional coatings to protect the ink layer 204.

A flood coat layer 206 may be disposed on the ink layer 204 such that the ink layer 204 is between and/or in direct contact with the carrier film 202 and/or the flood coat layer 206. The flood coat layer 206 optionally may be referred to as an embossing, an emboss coat layer, or the like. The flood coat layer 206 is formed from a soft and/or malleable material that can deform when pressure is applied to the coat layer 206, such as a thermoplastic material. For example, the coat layer 206 may be formed from one or more polymer materials, such as polyester, poly(methyl methacrylate) (PMMA), or the like.

The effect layer 208 can be deposited onto the coat layer 206 such that the coat layer 206 is between and/or in direct contact with the coat layer 206 and/or the effect layer 208. In one embodiment, the effect layer 208 is a metallized layer formed from one or more reflective materials, such as metals or metal alloys. The effect layer 208 can be a continuous conductive layer or can be formed from two or more separate conductive bodies (that are not conductively coupled). The effect layer 208 can be formed by evaporating, sputtering, printing, vapor depositing, or the like, one or more metals or metal alloys onto the coat layer 206. Optionally, the effect layer 208 can be formed using nanoparticles of ink, vacuum metalized pigments (VMP), super argents, or the like. The metals or metal alloys used to form the effect layer 208 may include aluminum, silver, or the like. Optionally, the effect layer 208 may be a refractive layer or diffractive layers (e.g., which result or cause a color shift) formed from one or more refractive layers, such as a refractive layer formed from one or more HRI materials.

The thickness of the effect layer 208 can be controlled in order to adjust the optical density of the surface of the object on which the effect layer 208 is printed for various optical effects and/or to positively influence the ease of transferring the ink layer 204, the coat layer 206, and/or the effect layer 208 onto the object.

As shown in FIG. 2, in one embodiment, the effect layer 208 can be deposited onto the coat layer 206 as a continuous sheet. As shown in FIG. 3, an embossing die 300 may be used to emboss a pattern of relief in the effect layer 208. The die 300 can be pressed down onto the effect layer 208 (and/or the laminate assembly 200 is pressed into the die 300). The pressure exerted on the laminate assembly 200 by the die 300 can emboss relief patterns in the effect layer 208. For example, the die 300 may include a body 302 that is cylindrical or flat, and that has one or more protrusions 304 extending therefrom. The die 300 can force the effect layer 208 onto the coat layer 206. The coat layer 206 may be more flexible and/or malleable than the effect layer 208 and, as a result, the pressure exerted by the die 300 can separate the effect layer 208 into separate, spaced apart bodies 400, as shown in FIG. 4. For example, the die 300 can stress and tear apart the effect layer 208 such that the bodies 400 are formed, with the bodies 400 being separated from each other by gaps 402 (shown in FIG. 4). The gaps 402 can represent cracks, such as micro-cracks through all or at least a portion of the thickness of the effect layer 208.

The embossing die 300 may be sufficiently large such that no seams between patterns formed by the die 300 are formed in the effect layer 208. For example, a cylindrical die 300 may be sufficiently wide as to extend over all or substantially all (e.g., at least 90% or another amount) of the width of the effect layer 208, as shown in FIG. 3. The die 300 may then be rolled over the effect layer 208 to emboss the relief pattern into the effect layer 208 across all or substantially all (e.g., at least 90% or another amount) of the length of the effect layer 208. As a result, the relief pattern is embossed on all or substantially all of the effect layer 208, without having to lift the die 300 and place the die 300 on another portion of the effect layer 208 to separately emboss another portion of the effect layer 208.

The relief pattern formed in the effect layer 208 by the bodies 400 and/or the gaps 402 can be combined with printed patterns formed by the printing of the ink layer 204. After applying the ink layer 204, coat layer 206, and effect layer 208 on a surface of an object, the effect layer 208 and/or ink layer 204 can provide dramatic and optically variable (or kinetic) decorations that appear to move, shimmer, change color, etc., as the viewing angle of the object is altered. The effect layer 208 (and/or the ink layer 204) can provide holographic, diffraction, textured, security or brushed patterns/designs/structures to be made and transferred to 3D surfaces. Alternatively, the relief pattern formed by the effect layer 208 can provide for relatively small security features, such as by forming microscopic text phrases, numbers, or the like.

Optionally, a black pigment and/or dye (or another color) could be printed directly behind (e.g., on top of) the embossing of the effect layer 208 to create the visual effect. The effect layer 208 can be reflective to provide a security feature, a functional feature, a decorative feature, and/or another feature for the object being decorated. For example, the effect layer 208 can provide a reflective layer used in a mirror or holographic layer on the surface of the object that assists in decorating the object, verifying authenticity of the object, or the like. Optionally, the ink layer 204 and/or effect layer 208 can be patterned to provide a variety of printed patterns of wood grains, marble, stone, metal finishes, textiles, geometric designs, carbon fiber, and so on, to achieve enhanced visual effects, security features, and ease of decoration of a 3D object.

The relief pattern in the effect layer 208 and/or the ink layer 204 can be patterned and registered with each other to provide registered, secure and unique effects to the surfaces of objects being decorated. Additionally, the effect layer 208 can provide for at least some scratch or mar resistance, chemical resistance, resistance to wear and tear due to weather, or the like, to the object being decorated. In one embodiment, the object on which the laminate assembly is transferred does not need a post-finishing operation, such as over-coating the object with a clear polymer coating, to protect the decorations formed by the laminate assembly.

FIGS. 5 through 8 illustrate cross-sectional views of a laminate assembly 500 during manufacturing of the laminate assembly 500 according to another embodiment. The laminate assembly 500 may represent the laminate assembly 106 shown in FIG. 1. The laminate assembly 500 includes the carrier film 202 and the coat layer 206 ("Emboss coat layer" in FIGS. 5 through 8) described above. One difference between the laminate assembly 500 and the laminate assembly 200 shown in FIG. 2 is the absence of the ink layer 204 (shown in FIG. 2) in the laminate assembly 500. For example, the coat layer 206 can be deposited directly onto the carrier film 202.

Figure 5:
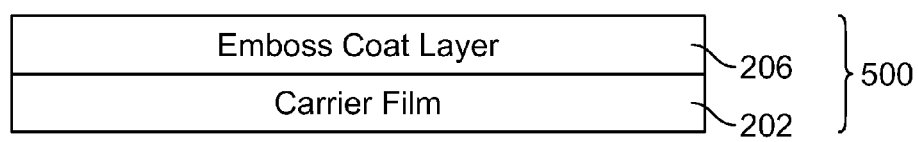
FIG. 5 illustrates a cross-sectional view of a laminate assembly during manufacturing of the laminate assembly according to another embodiment.
Figure 6:
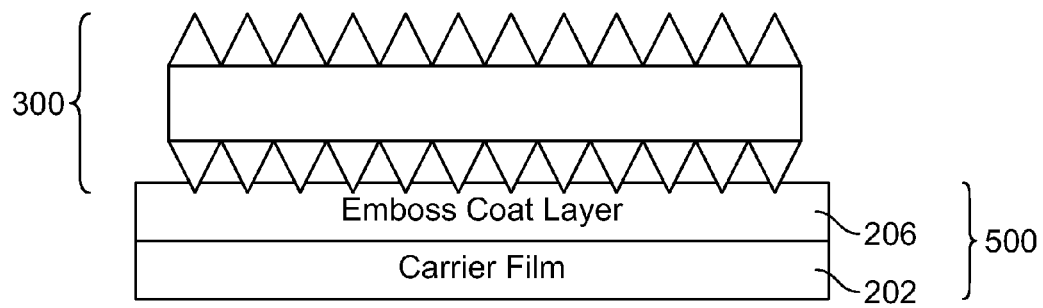
FIG. 6 illustrates a cross-sectional view of a laminate assembly during manufacturing of the laminate assembly according to another embodiment.
Figure 7:
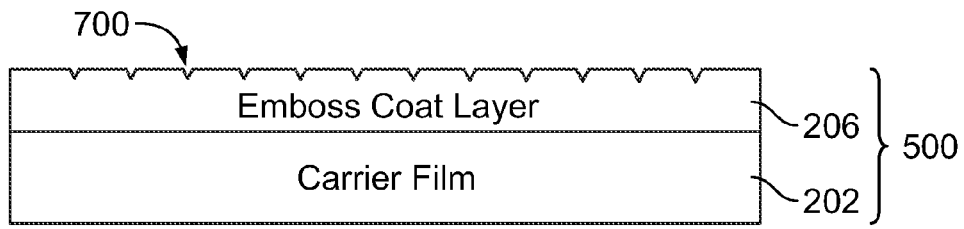
FIG. 7 illustrates a cross-sectional view of a laminate assembly during manufacturing of the laminate assembly according to another embodiment.

Another difference between the laminate assemblies 200, 500 is that the relief pattern formed by the die 300 can be formed in the coat layer 206 in the laminate assembly 500 shown in FIG. 5 instead of in the effect layer 208 (shown in FIG. 2) of the laminate assembly 200 shown in FIG. 2. As shown in FIGS. 6 and 7, the die 300 can directly engage the coat layer 206 and emboss the coat layer 206 to form embossed patterns 700, or recesses, in the coat layer 206. In the illustrated example, the patterns 700 extend into the coat layer 206 to form an undulating or otherwise uneven surface of the coat layer 206.

Figure 8:
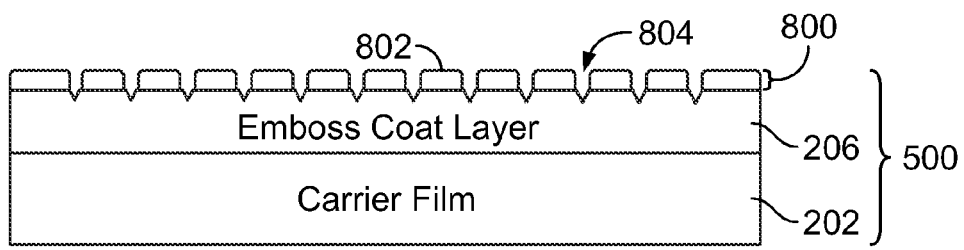
FIG. 8 illustrates a cross-sectional view of a laminate assembly during manufacturing of the laminate assembly according to another embodiment.

As shown in FIG. 8, an effect layer 800 can be formed on the embossed coat layer 206. The effect layer 800 can be deposited onto the coat layer 206 such that the coat layer 206 is between and/or in direct contact with the coat layer 206 and/or the effect layer 800. In one embodiment, the effect layer 800 is a metallized layer formed from one or more reflective materials, such as metals or metal alloys.

The effect layer 800 can be formed from one or more of the materials used to form the effect layer 208. In the illustrated embodiment, the effect layer 800 includes discrete bodies 802 that are spaced apart from each other. For example, the bodies 802 may be separate from each other by gaps 804 such that the bodies 802 do not engage each other. The bodies 802 can be formed by selective deposition of metallic materials (e.g., "DEMET"), such as selective additive metallization or selective subtractive metallization. In selective additive metallization, an evaporative material, such as an oil, can be deposited onto the coat layer 206 in locations where the bodies 802 are not to be located (e.g., in the gaps 804). The material used to form the bodies 802 (e.g., metals or metal alloys) are heated in a vacuum chamber to cause the material to evaporate from a source of the material and then condense on the coat layer 206 in the locations where the evaporative material is not located (e.g., in the gaps 804) to form the bodies 802. During deposition of the bodies 802, the evaporative material can prevent deposition of the bodies 802 in the locations where the oil is present (e.g., in the gaps 804). The evaporative material may evaporate from the coat layer 206 during deposition of the bodies 802.

In selective subtractive metallization, a continuous layer of the materials used to form the bodies 802 of the effect layer 800 may be deposited onto the coat layer 206. For example, a layer similar to the effect layer 208 shown in FIG. 2 may be deposited on the coat layer 206 in both the gaps 804 and the areas between the gaps 802. A mask may be printed or placed onto the layer that has been deposited on the coat layer 206. This mask may cover and protect some portions of the deposited layer from removal (e.g., the portions between the gaps 804) during a subsequent etching operation that removes the other portions of the deposited layer. The mask may then be removed from the deposited layer. Due to the mask protecting the portions of the deposited layer between the gaps 804, the bodies 802 may be left after removal of the mask.

In another example, the effect layer 800 may be formed by printing the layer 800 using reflective pigments or inks, diffractive pigments or inks (e.g., that change the wavelengths of light reflected off of the layer 800), or the like. Optionally, the bodies 802 of the effect layer 800 may be formed using three dimensional printing.

The bodies 802 of the effect layer 800 form a relief pattern that can provide dramatic and optically variable (or kinetic) decorations that appear to "move" or "shimmer" as the viewing angle of the object are altered. Optionally, a black pigment and/or dye (or another color) could be printed on top of and/or below the effect layer 800 to create the visual effect. The effect layer 800 can be reflective to provide a security feature, a functional feature, a decorative feature, and/or another feature for the object being decorated. For example, the effect layer 800 can provide a reflective layer used in a mirror or holographic layer on the surface of the object that assists in decorating the object, verifying authenticity of the object, or the like. In one embodiment, the object on which the laminate assembly is transferred does not need a post-finishing operation, such as over-coating the object with a clear polymer coating, to protect the decorations formed by the laminate assembly.

Figure 9:
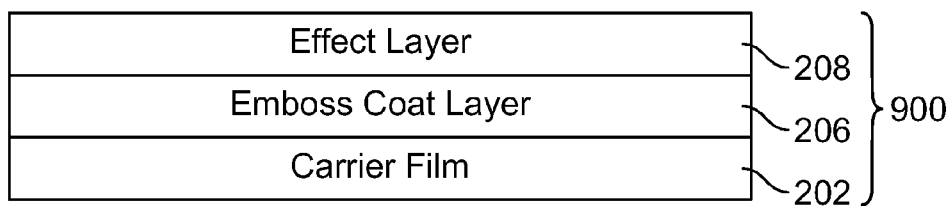
FIG. 9 illustrates a cross-sectional view of a laminate assembly during manufacturing of the laminate assembly according to another embodiment.
Figure 10:
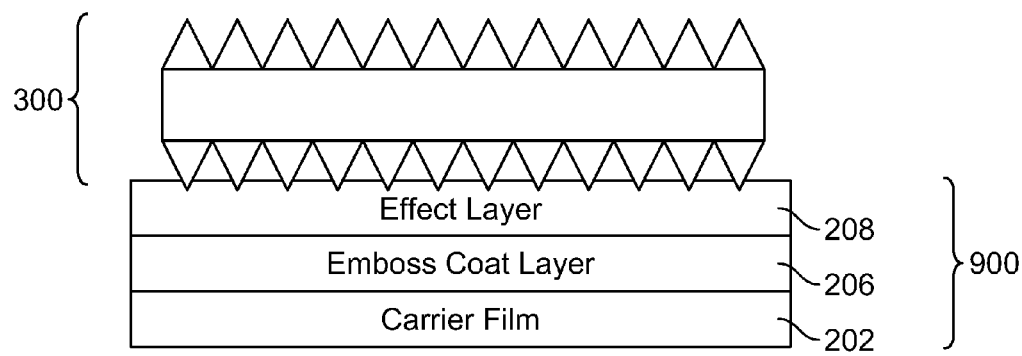
FIG. 10 illustrates a cross-sectional view of a laminate assembly during manufacturing of the laminate assembly according to another embodiment.
Figure 11:
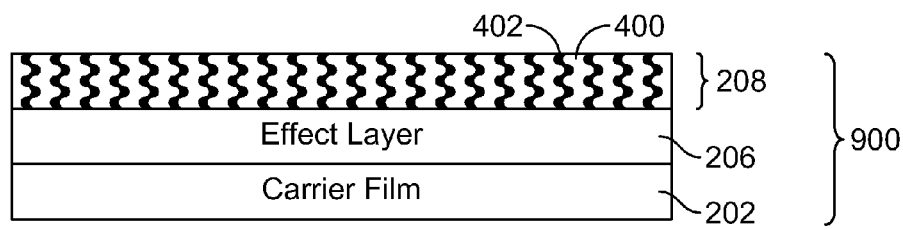
FIG. 11 illustrates a cross-sectional view of a laminate assembly during manufacturing of the laminate assembly according to another embodiment.

FIGS. 9 through 11 illustrate cross-sectional views of a laminate assembly 900 during manufacturing of the laminate assembly 900 according to another embodiment. The laminate assembly 900 may represent the laminate assembly 106 shown in FIG. 1. The laminate assembly 900 includes the carrier film 202, the coat layer 206 ("Emboss coat layer" in FIGS. 9 through 11), and the effect layer 208 described above. One difference between the laminate assembly 900 and the laminate assembly 200 shown in FIG. 2 is the absence of the ink layer 204 (shown in FIG. 2) in the laminate assembly 500. For example, the coat layer 206 can be deposited directly onto the carrier film 202.

As shown in FIGS. 9 and 10, in one embodiment, the effect layer 208 can be deposited onto the coat layer 206 as a continuous sheet. The embossing die 300 may be used to emboss a pattern of relief in the effect layer 208. The relief pattern formed in the effect layer 208 can include the bodies 400 and/or the gaps 402 described above in connection with FIG. 4. After applying the ink layer 204, coat layer 206, and effect layer 208 on a surface of an object being decorated, the effect layer 208 and/or ink layer 204 can provide dramatic and optically variable (or kinetic) decorations that appear to "move" or "shimmer" as the viewing angle of the object are altered. Optionally, a black pigment and/or dye (or another color) could be printed directly behind (e.g., on top of) the embossing of the effect layer 208 to create the visual effect. The effect layer 208 can be reflective to provide a security feature, a functional feature, a decorative feature, and/or another feature for the object being decorated. For example, the effect layer 208 can provide a reflective layer used in a mirror or holographic layer on the surface of the object that assists in decorating the object, verifying authenticity of the object, or the like.

The order in which two or more layers of the laminate assemblies shown in FIGS. 2 through 11 are deposited can impact the transfer of the layers from the liquid 104 in the vat 102 to the object being decorated using the hydrographic transfer system 100 shown in FIG. 1. For example, depositing the effect layer 208 prior to embossing the effect layer 208 (e.g., as described above in connection with the laminate assemblies 200, 900) can form the gaps 402 in the effect layer 208. These gaps 402 can break up the effect layer 208 into smaller portions, which can ease the application of the laminate assemblies 200, 900 onto the object in the transfer system 100 relative to the laminate assembly 500.

While embossing is used to form the relief patterns in the effect layers 208 described herein, optionally, another technique may be used to form the relief patterns. For example, the materials forming the effect layers 208 can be selectively deposited or printed (e.g., using VMP inks, color-shift inks, or the like) in certain areas and not deposited or printed in other areas, deposited or printed in different thicknesses in different areas, or the like, to form a relief pattern. In one embodiment, the object on which the laminate assembly is transferred does not need a post-finishing operation, such as over-coating the object with a clear polymer coating, to protect the decorations formed by the laminate assembly.

Figure 12:
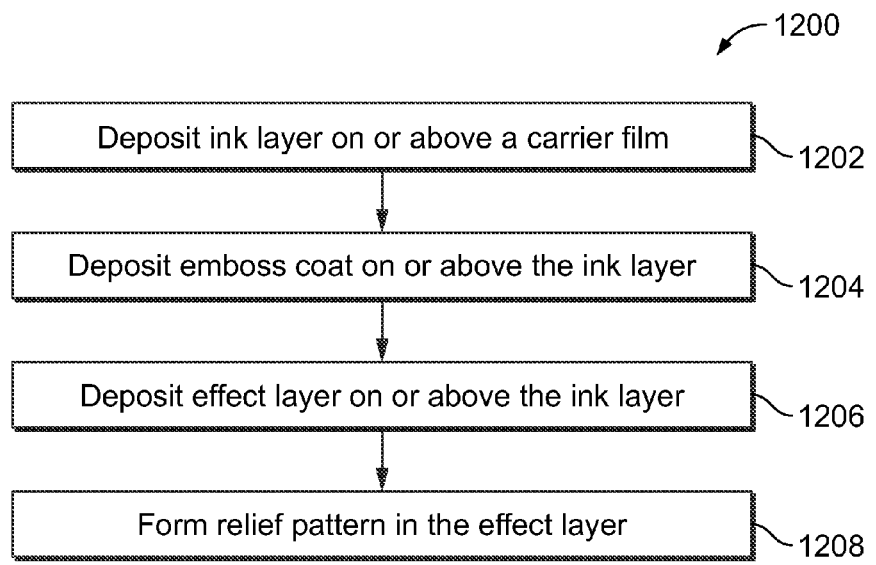
FIG. 12 illustrates a flowchart of a method for manufacturing a laminate assembly for use in a hydrographic transfer system according to one embodiment.

FIG. 12 illustrates a flowchart of a method 1200 for manufacturing a laminate assembly for use in a hydrographic transfer system according to one embodiment. The method 1200 may be used to manufacture the laminate assembly 200 shown in FIG. 4. At 1202, one or more ink layers 204 are deposited onto or above the carrier film 202. At 1204, the emboss or flood coat layer 206 is deposited onto or above the ink layer 204. At 1206, the effect layer 208 is deposited onto or above the coat layer 206. At 1208, a relief pattern is formed in the effect layer 208, such as by embossing.

Figure 13:
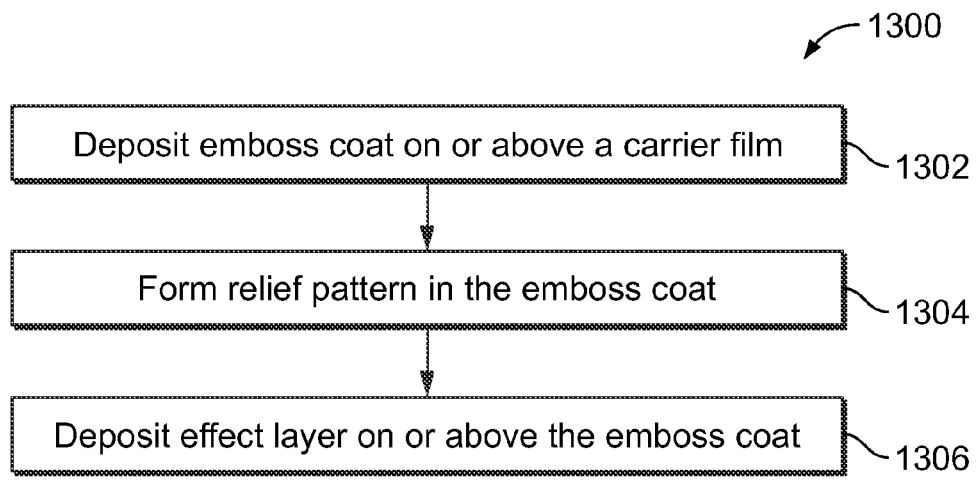
FIG. 13 illustrates a flowchart of a method for manufacturing a laminate assembly for use in a hydrographic transfer system according to another embodiment.

FIG. 13 illustrates a flowchart of a method 1200 for manufacturing a laminate assembly for use in a hydrographic transfer system according to one embodiment. The method 1300 may be used to manufacture the laminate assembly 500 shown in FIG. 8. At 1302, the emboss or flood coat layer 206 is deposited onto or above the carrier film 202. At 1304, a relief pattern is formed in the effect layer 208, such as by embossing. At 1306, the effect layer is deposited on or above the coat layer 206, such as by using selective metal deposition or another technique.

Figure 14:
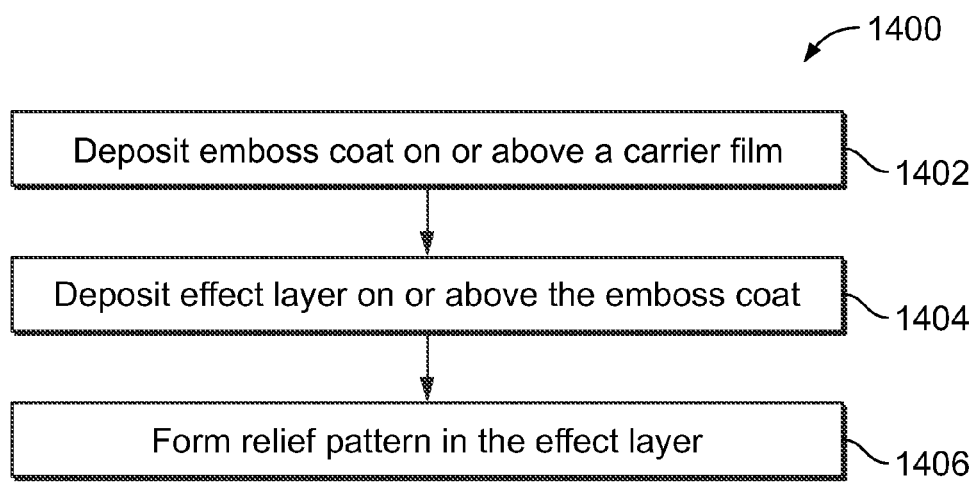
FIG. 14 illustrates a flowchart of a method for manufacturing a laminate assembly for use in a hydrographic transfer system according to another embodiment

FIG. 14 illustrates a flowchart of a method 1400 for manufacturing a laminate assembly for use in a hydrographic transfer system according to one embodiment. The method 1400 may be used to manufacture the laminate assembly 900 shown in FIG. 11. At 1402, the emboss or flood coat layer 206 is deposited onto or above the carrier film 202. At 1404, the effect layer 208 is deposited onto or above the coat layer 206. At 1406, a relief pattern is formed in the effect layer 208, such as by embossing.

In one embodiment, a laminate assembly for decorating an object in a hydrographic transfer system is provided. The laminate assembly includes a carrier film configured to be soluble when placed into the hydrographic transfer system, an optical effect layer configured to provide one or more of an optical effect or a security feature to the object, one or more ink layers disposed between the carrier film and the effect layer, and a coat layer disposed between the one or more ink layers and the optical effect layer. The effect layer includes a relief pattern configured to provide the one or more of the optical effect or the security feature to the object.

In one aspect, the effect layer is formed from one or more of a metal, a metal alloy, or a high refractive index material.

In one aspect, the optical effect provided by the effect layer includes one or more of a holographic design or a design that changes color based on a viewing angle.

In one aspect, the effect layer includes a relief pattern that provides the one or more of the optical effect or the security feature.

In one aspect, the relief pattern is defined by separate bodies of the effect layer separated by gaps.

In one aspect, the relief pattern is defined by separate bodies of the effect layer separated by microcracks.

In one aspect, the relief pattern is an embossed pattern in the effect layer.

In another embodiment, a laminate assembly for transferring decoration onto an object in a hydrographic transfer system is provided. The laminate assembly includes a carrier film configured to be soluble when placed into the hydrographic transfer system, an optical effect layer configured to provide one or more of an optical effect or a security feature to the object, and a coat layer disposed between the carrier layer and the optical effect layer. The effect layer includes a relief pattern configured to provide the one or more of the optical effect or the security feature to the object.

In one aspect, the effect layer is formed from one or more of a metal, a metal alloy, and/or a high refractive index material.

In one aspect, the optical effect provided by the effect layer includes one or more of a holographic design and/or a design that changes color based on a viewing angle.

In one aspect, the effect layer includes a relief pattern that provides the one or more of the optical effect and/or the security feature.

In one aspect, the relief pattern is defined by separate bodies of the effect layer separated by gaps.

In one aspect, the coat layer is an embossed layer.

In one aspect, the relief pattern is defined by separate bodies of the effect layer separated by microcracks.

In one aspect, the relief pattern is an embossed pattern in the effect layer.

In another embodiment, a method for manufacturing a laminate assembly for being transferred onto an object in a hydrographic-transfer system is provided. The method includes depositing one or more ink layers above a carrier film configured to be soluble when placed into the hydrographic transfer system, depositing a coat layer above the one or more ink layers, depositing an optical effect layer above the coat layer, and forming a relief pattern in the optical effect layer. The relief pattern is configured to provide one or more of an optical effect or a security feature to the object.

In one aspect, forming the relief pattern includes embossing the relief pattern in the optical effect layer.

In one aspect, depositing the effect layer includes depositing one or more of a metal, a metal alloy, and/or a high refractive index material.

In one aspect, depositing the one or more ink layers includes printing the one or more ink layers using one or more of thermal transfer printing, digital ink jet printing, three dimensional printing, and/or cross-linking ink in the one or more ink layers.

In one aspect, depositing the effect layer includes vapor depositing one or more metals and/or metal alloys.

In one aspect, the optical effect provided by the effect layer includes one or more of a holographic design and/or a design that changes color based on a viewing angle.

In one aspect, forming the relief pattern includes forming one or more separate bodies of the effect layer that are separated from each other by gaps.

In one aspect, forming the relief pattern includes one or more of depositing a reflective layer using selective additive metal deposition, depositing the reflective layer using selective subtractive metal deposition, printing one or more layers with a reflective pigment, and/or printing one or more layers with a diffractive pigment.

In one aspect, forming the relief pattern includes forming microcracks in the effect layer.

In one aspect, forming the relief pattern includes embossing the effect layer.

In another embodiment, a method for manufacturing a laminate assembly for printing on an object in a hydrographic transfer system is provided. The method includes depositing a coat layer above a carrier film, depositing an optical effect layer above the coat layer, and forming a relief pattern in the optical effect layer, the relief pattern configured to provide one or more of an optical effect or a security feature to the object.

In one aspect, forming the relief pattern includes embossing the relief pattern in the optical effect layer.

In one aspect, depositing the effect layer includes depositing one or more of a metal, a metal alloy, and/or a high refractive index material.

In one aspect, depositing the effect layer includes vapor depositing one or more metals and/or metal alloys.

In one aspect, the optical effect provided by the effect layer includes one or more of a holographic design and/or a design that changes color based on a viewing angle.

In one aspect, forming the relief pattern includes forming one or more separate bodies of the effect layer that are separated from each other by gaps.

In one aspect, forming the relief pattern includes one or more of depositing a reflective layer using selective additive metal deposition, depositing the reflective layer using selective subtractive metal deposition, printing one or more layers with a reflective pigment, and/or printing one or more layers with a diffractive pigment.

In one aspect, forming the relief pattern includes forming microcracks in the effect layer.

In one aspect, forming the relief pattern includes embossing the effect layer.

In one aspect, forming the pattern includes forming a texture in the effect layer.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. §112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

The invention claimed is:

1. A laminate assembly for decorating an object in a hydrographic transfer system, the laminate assembly comprising:
   a carrier film configured to be soluble when placed into the hydrographic transfer system;
   an optical effect layer configured to provide one or more of an optical effect or a security feature to the object, the effect layer including a relief pattern formed by cracks extending through an entire thickness of the effect layer;
   one or more ink layers disposed between the carrier film and the effect layer; and
   a coat layer disposed between the one or more ink layers and the optical effect layer, wherein the effect layer includes a relief pattern configured to provide the one or more of the optical effect or the security feature to the object.

2. The laminate assembly of claim 1, wherein the effect layer is formed from one or more of a metal, a metal alloy, or a high refractive index material.

3. The laminate assembly of claim 1, wherein the optical effect provided by the effect layer includes one or more of a holographic design or a design that changes color based on a viewing angle.

4. The laminate assembly of claim 1, wherein the relief pattern in the effect layer provides the one or more of the optical effect or the security feature.

5. The laminate assembly of claim 1, wherein the effect layer is formed by separate bodies that are laterally separated from each other by the cracks in directions that are parallel to a surface of the effect layer that faces the coat layer.

6. The laminate assembly of claim 1, wherein the cracks that extend through the entire thickness of the effect layer are microcracks.

7. The laminate assembly of claim 1, wherein the relief pattern is an embossed pattern in the effect layer.

8. A laminate assembly for transferring decoration onto an object in a hydrographic transfer system, the laminate assembly comprising:
   a carrier film configured to be soluble when placed into the hydrographic transfer system;
   an optical effect layer configured to provide one or more of an optical effect or a security feature to the object, the effect layer formed by separate bodies that are spaced apart from each other by gaps; and
   a coat layer disposed between the carrier layer and the optical effect layer, wherein the effect layer includes a relief pattern configured to provide the one or more of the optical effect or the security feature to the object.

9. The laminate assembly of claim 8, wherein the effect layer is formed from one or more of a metal, a metal alloy, or a high refractive index material.

10. The laminate assembly of claim 8, wherein the optical effect provided by the effect layer includes one or more of a holographic design or a design that changes color based on a viewing angle.

11. The laminate assembly of claim 8, wherein the effect layer includes a relief pattern that provides the one or more of the optical effect or the security feature.

12. The laminate assembly of claim 11, wherein the relief pattern is defined by the separate bodies that form the effect layer.

13. The laminate assembly of claim 11, wherein the coat layer is an embossed layer.

14. The laminate assembly of claim 11, wherein the gaps that separate the separate bodies that form the effect layer are microcracks.

15. The laminate assembly of claim 11, wherein the relief pattern is an embossed pattern in the effect layer.

16. A laminate assembly for decorating an object in a hydrographic transfer system, the laminate assembly comprising:
   a soluble carrier film;
   a design layer having a relief pattern formed in a reflective or diffractive layer and providing an optical effect on the object, the reflective or diffractive layer formed by cracks extending through an entire thickness of the reflective or diffractive layer; and
   one or more ink layers disposed between the carrier film and the design layer.

17. The laminate assembly of claim 16, wherein the design layer provides an optical effect design that changes color based on a viewing angle of the object.

18. The laminate assembly of claim 16, wherein the relief pattern in the design layer is formed by separate bodies that are separated from each other by the cracks in the reflective or diffractive layer spaced apart from each other by gaps.

19. The laminate assembly of claim 18, wherein the cracks that separate the bodies in the reflective or diffractive layer are spaced apart from each other are microcracks.

20. The laminate assembly of claim 18, wherein the relief pattern in the design layer is an embossed pattern.

* * * * *